United States Patent [19]

Fukui et al.

[11] Patent Number: 5,310,432
[45] Date of Patent: May 10, 1994

[54] TOOTHED WHEEL FOR USE IN AUTOMOBILES AND ITS MANUFACTURING METHOD

[75] Inventors: Kiyoshi Fukui, Nishinomiya; Shigeaki Yamanaka, Hiroshima, both of Japan

[73] Assignees: Sumitomo Metal Industries, Ltd., Osaka; Kubota Iron Works Co., Ltd., Hiroshima, both of Japan

[21] Appl. No.: 83,266

[22] Filed: Jun. 29, 1993

[30] Foreign Application Priority Data

Jun. 30, 1992 [JP] Japan .................................. 4-171408

[51] Int. Cl.⁵ .............................................. C22C 38/16
[52] U.S. Cl. ...................................... 148/330; 420/84; 420/92; 420/121; 74/460
[58] Field of Search ..................... 148/330, 332; 420/84, 420/92, 119, 121; 74/460

[56] References Cited

U.S. PATENT DOCUMENTS

| | | | |
|---|---|---|---|
| 4,407,681 | 10/1983 | Ina et al. | 148/332 |
| 4,431,445 | 2/1984 | Furusawa et al. | 420/84 |
| 5,139,583 | 8/1992 | Kawabata et al. | 148/330 |

FOREIGN PATENT DOCUMENTS

| | | |
|---|---|---|
| 3819957 | 3/1988 | Fed. Rep. of Germany . |
| 54-20190 | 7/1979 | Japan . |
| 54-44259 | 12/1979 | Japan . |
| 1-161252 | 11/1989 | Japan . |

*Primary Examiner*—George Wyszomierski
*Attorney, Agent, or Firm*—Burns, Doane, Swecker & Mathis

[57] ABSTRACT

A toothed wheel for use in automobiles and a method for its manufacture are disclosed. The toothed gear is of a dish-shaped disk having a thickened peripheral edge portion in an outer and/or inner side of which gear teeth are shaped, at least the surface area of the gear teeth being of a martensite structure, the disk being made of a steel comprising a ferrite-cementite-graphite structure in which 50% or more of cementite has been changed to graphite, the steel composition of the disk consisting essentially of, by weight %:

C: 0.20–0.70%, Si: 0.05–1.00%, Mn: 0.05–0.50%, sol. Al: 0.01–1.00%, N: 0.002–0.010%, B: 0.0003–0.0050%, Ca: 0–0.01%, Cu: 0–1.00%, Ni: 0–2.00%, and a balance of Fe and incidental impurities in which the content of P is restricted to not larger than 0.020% and the content of S is restricted to not larger than 0.010%.

2 Claims, 3 Drawing Sheets

TOOTHED WHEEL FOR USE IN AUTOMOBILES AND ITS MANUFACTURING METHOD

The present invention relates to a toothed wheel and a method for its manufacture. In particular, the present invention relates to a toothed wheel, i.e., a gear for use in automatic transmissions or clutches of automobiles and a toothed wheel for use in a drive plate of starters of automobiles.

Drive plate gears having a diameter of 200 mm or larger have been manufactured by pressing a plate to form a thin disk, forming a toothed gear in the peripheral edge of a ring, forcing the disk into the ring, and securing them by welding. A rotary boss, if any, is also secured to the disk by welding.

Other methods are disclosed in Japanese Patent Publication No.54-44259/1979 and No.54-20190/1979, in which a thick portion along the periphery of the plate is formed of a multi-folded thin plate.

Still another method is disclosed in German Patent 3,819,957, in which the peripheral portion of a disk is made thick by folding or spinning the periphery of the disk and then shaping gear tooth in the peripheral surface.

Laid-Open Japanese Utility Model Application Unexamined Specification No.1-161252/1989 discloses a jig for use in carrying out heat treatment after forming a toothed wheel or gear.

Of the above-described conventional methods of forming a toothed wheel, the first two methods which require two parts to be assembled are expensive since the gear teeth are formed by machining with a gear hobbing machine. In addition, it is also necessary to flatten the overall surface of the disk to remove distortions caused by welding.

In the other cases where a thin plate is used to manufacture one-piece gears, it is difficult to shape the teeth and to form a thick portion having a uniform thickness. In particular, spinning is not suitable to give a sufficient thickness to shape gear teeth.

SUMMARY OF THE INVENTION

An object of the present invention is to provide a toothed wheel and a method of manufacturing the toothed wheel, which is useful for being assembled in an automatic transmission, clutch, or drive plate for a starter.

Another object of the present invention is to provide a lightweight toothed wheel and a method of manufacturing the same, which is formed in onepiece and has hardened gear teeth.

One of the inventors of the present invention proposed in Japanese Patent Application No.2-415666/1990 a process for manufacturing a toothed wheel for use in automatic transmissions or clutches of automobiles and a toothed wheel for use in a drive plate of starters of automobiles. According to the proposed process, a disk is subjected to swaging in the radial direction on its peripheral surface with a swaging die so that the outer peripheral edge portion of the disk is thickened. An inner side portion thereof is then subjected to press-forging in the axial direction to form a shallow dish-shaped blank. When gear teeth are formed, a supporting die is forced to fit either the outer or inner edges of the peripheral thickened portion, and a teeth-shaping die is forced into the other one to form gear teeth in either of outer or inner edges of the thickened portion.

However, high-carbon steel plates, which are used in most cases including the above-described case, are relatively hard (HRB=75-85) compared with mild steel plate (HRB=about 30), and their machinability as well as formability in cold forging are no match for those of mild steel, even when cementite has been spherodized. It takes, therefore, much time to shape gear teeth by machining, and an increase in material costs including tool costs is inevitable. In addition, cracking is also inevitable during cold forging.

In order to remove the above-described disadvantages, it has been thought that the carbon content must be restricted to not larger than 0.15%. When the carbon content is over 0.15%, disadvantages such as cracking during forming are inevitable.

A running test was carried out using an automobile in which an automatic transmission employing toothed wheels formed of the above-mentioned low-carbon steel plate was installed. The test results indicated that the surface of gear tooth is worn out in a short period of time, resulting in troubles such as vibration. In order to suppress a reduction in height of gear teeth, it is necessary to apply surface treatments such as carburizing, soft-nitriding, and the like. Such surface treatments require heating at a high temperature for a long time, which further increases energy and equipment costs markedly.

According to the present invention, therefore, a steel plate having a ferrite-cementite-graphite complex structure in which more than 50% of cementite has been changed to a graphite structure is used to manufacture the toothed wheel. This steel plate is ductile in spite of a high carbon content because of a high graphitization.

A disk is blanked from this plate, and the outer peripheral edge portion is shaped by swaging in the axial direction with a swaging die to thicken the outer peripheral edge portion of the disk. The inner side of the swaged area is then pressed in the axial direction to make a shallow dish-shaped blank.

A support die is inserted into either the outer or the inner periphery of the thus-shaped blank, i.e., thickened peripheral edge portion, and a toothed die is inserted into the other one so that gear teeth are formed in the outer and/or inner periphery of the blank. Alternatively, gear teeth can be formed by roll forming, cutting, and the like. After shaping the gear teeth, they are subjected to induction hardening or the like to harden the teeth.

In summary, the present invention is a toothed wheel for use in automobiles, which is in the form of a shallow dish-shaped disk having a thickened peripheral edge portion in an outer and/or inner side of which gear teeth are shaped, at least the surface area of the gear teeth being of a martensite structure, the disk being made of a steel comprising a ferrite-cementite-graphite structure in which 50% or more of cementite has been changed to graphite, and the steel composition of the disk consisting essentially of, by weight %:

C: 0.20–0.70%, Si: 0.05–1.00%, Mn: 0.05–0.50%, sol.Al: 0.01–1.00%, N: 0.002–0.010%, B: 0.0003–0.0050%, optionally at least one of 0.001–0.01% of Ca, 0.05–1.00% of Cu, 0.05–2.00% of Ni, and a balance of Fe and incidental impurities in which the content of P is restricted to not larger than 0.020% and the content of S is restricted to not larger than 0.010%.

In another aspect, the present invention is a method of producing a toothed wheel for use in automobiles, comprising the steps of preparing a steel plate having the steel composition described above, forming a disk-shaped blank from this plate, swaging an outer peripheral edge of the disk blank in the axial direction with a swaging die to thicken the outer peripheral edge of the disk, pressing the inner area surrounded by the swaged area in the axial direction to make a flat dish-shaped blank, inserting a support die into either the outer or the inner periphery of the thus-shaped thickened blank, inserting a toothed die into the other one to form gear teeth on the outer and/or inner periphery of the thickened blank, and applying surface hardening treatments such as high frequency induction hardening to the gear teeth.

In still another aspect, the present invention is a method of producing a toothed wheel for use in automobiles, as described above, in which instead of shaping gear teeth with a gear die, the gear teeth are shaped by roll forming with a rolling die or cutting with a gear cutting machine or hobbing with a gear hobbing machine. In a preferred embodiment of the present invention, a high-carbon, thin steel plate from which the toothed wheel is produced and which has a metallic structure comprising ferrite, graphite and cementite and has excellent formability can be manufactured by the following steps (i) to (iv):

i) Hot rolling is carried out with a finishing temperature of 600°–900° C. so as to precipitate a suitable pearlite structure. Although the soaking temperature prior to hot rolling is not restricted to a specific one, it is desirable that the soaking be carried out at 1100° C. or higher for one hour or longer, usually at about 1250° C. for 2 hours.

(ii) Cooling after hot rolling is carried out at a rate of 5°–40° C./sec to the below-mentioned coiling temperature in order to refine a pearlite structure.

(iii) Coiling is carried out at a temperature of 400°–650° C. in order to stabilize the precipitated refined pearlite structure.

(iv) Annealing is carried out, after coiling, by heating at a temperature in the range of 600° C. to $Ac_1$ in order for cementite in steel to precipitate as graphite.

The graphitization ratio can be varied by changing the temperature and time for heating. It is preferable to adjust the graphitization ratio to be 50% or higher in order to provide a steel plate with a satisfactory level of softness. It is advisable to determine the heating temperature and time such that the value of the heating temperature (°C.) X heating time (hour) is 10000–30000.

According to the present invention in which the thickness of a starting steel plate is rather small, the annealing time is usually about 24 hours for the heating temperature range of 600° C. to $Ac_1$ point.

The graphitization ratio was determined by the following formula after etching with a nital solution and inspecting the micro-structure at a magnification of 500X with an optical microscope.

Graphitization (%)=(1−(cementite-precipitated area after annealing)/(cementite-precipitated area before annealing)) ×100(%)

DETAILED DESCRIPTION OF THE PREFERRED EMBODIMENTS OF THE INVENTION

Figure 1:
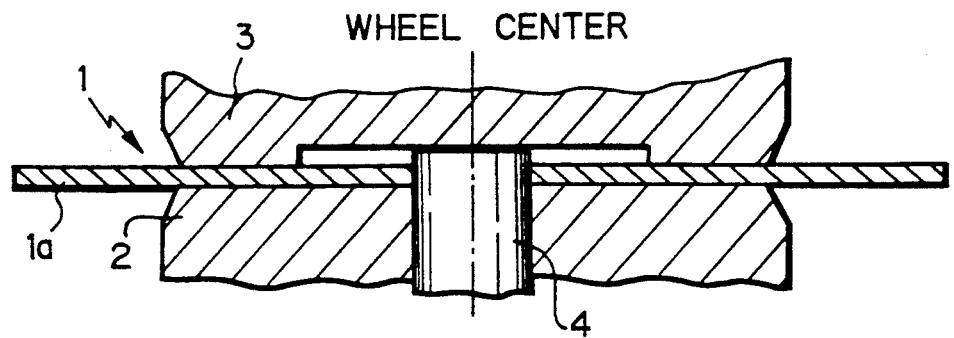
FIG. 1 is a schematic cross-sectional view of the swaging forming position in which a disk blank is supported in a fixed position.

The reasons for the steel composition and the preferred working conditions used in the present invention will now be described.

I. Steel Composition

C (Carbon)

Generally, the lower the carbon content the higher the formability. On the other hand, it is necessary to incorporate some amount of carbon in order to ensure wear resistance, hardness, and fatigue resistance. According to the present invention in which a TS (tensile strength) of 100 kgf/mm² or more (300 or more of Hv scale hardness) is ensured after heat treatment such as quenching and tempering or austempering, the carbon content is restricted to 0.20% or more. When the carbon content increases excessively, toughness, particularly the resistance to thermal shock of a weld, is markedly degraded, and cracking caused by welding or heat treatment is inevitable. In addition, cracking during shaping becomes serious. For the purpose of preventing such disadvantages, the upper limit of the carbon content is restricted to 0.70%, and preferably to 0.40%.

Si (Silicon)

Silicon is an element necessary for carrying out graphitization of cementite. However, according to the present invention, it is necessary to suppress the TS to 350 N/mm² or less during formation, and the Si content is desirably restricted to be as small as possible, since Si in solid solution can markedly increase tensile strength of the resulting steel. Thus, the upper limit of Si is restricted to 1.00%. On the other hand, it is necessary to incorporate some amount of Si in order to promote graphitization or as a deoxidizing agent. Thus, the lower limit of the Si content is defined as 0.05%. Preferably, the Si content is 0.20–0.50%.

Mn (Manganese)

Manganese has a marked adverse effect on precipitation of graphite, since the presence of manganese stabilizes cementite and suppresses decomposition of cementite even when heating for annealing is taking place. Thus, the upper limit of Mn is restricted to 0.50%. On the other hand, since manganese will combine with S in steel to form MnS, manganese is effective for improving toughness as well as hardenability, and a certain amount of Mn is necessary to incorporate in steel. The lower limit is defined as 0.05%. A preferred content of Mn is 0.15–0.30%.

sol Al

The higher the content of sol. Al the more easily the precipitation of graphite takes place. The content of sol. Al is, therefore, restricted to not less than 0.01%. However, the presence of an excess amount of sol. Al causes disadvantages such as solid-solution hardening of a ferritic phase and an increase in an amount of oxides precipitated in steel. This sometimes results in a marked degradation in toughness of steel after heat treatment. Thus, according to the present invention the upper limit of sol. Al is defined as 1.00%. Preferably, the content of sol. Al is 0.05–0.15%.

N (Nitrogen)

Nitrogen is inevitably contained in steel. Nitrogen forms aluminum nitrides (AlN, etc.) during heat treatment such as quenching and tempering or austempering so that coarsening of austenitic grains can be suppressed, resulting in prevention of dimensional distortion before and after heat treatment. The presence of nitrogen is also effective for improving toughness after heat treatment. For these purposes the content of nitrogen is restricted to 0.002% or more, and preferably to 0.003% or more. However, when the content of nitrogen is over 0.010%, such an excess amount of nitrogen results in a degradation in elongation, so the upper limit of nitrogen is restricted to 0.010%, and preferably to 0.008%.

B (Boron)

Boron is effective for improving toughness after heat treatment and hardenability. For these purposes boron is added in an amount of 0.0003% or more. On the other hand, when the boron content is over 0.0050%, formation of FeB is inevitable during hot rolling or heat treatment, resulting in a serious adverse effect on the toughness of steel. According to the present invention, the boron content is restricted to 0.0003–0.0050%, and preferably 0.0005–0.0020%.

According to a preferred embodiment of the present invention, at least one of Ca, Cu and Ni may be added so as to further promote graphitization of cementite of a pearlite phase and induction hardenability (hardenability when heated by high frequency induction heating).

Ca (calcium)

The addition of Ca to steel has an effect on a reduction in the amount of oxygen dissolved in steel and the amount of aluminum oxides.

It is to be noted that according to the present invention the amount of sol. Al is increased so as to promote graphitization. Thus, there is a tendency that the amount of aluminum oxides will be increased. On the other hand, the Mn content is restricted to a lower level in the present invention, so a decrease in the amount of sulfur dissolved in steel, which is caused by the formation of MnS inclusions, is not thorough.

Thus, according to the present invention, when graphitization is not enough to achieve the purpose of the present invention, it is preferable to add calcium so as to fix sulfur as calcium sulfides. For this purpose the lower limit of calcium is 0.001%. Since the addition of an excess amount of calcium causes an increase in material costs and formation of calcium oxides and sulfides, the upper limit of calcium added is restricted to 0.01%. However, when the content of carbon or Si or Mn is high, the graphitization is promoted and there is no need to add calcium.

Cu (Copper)

Copper is one of a small group of elements which are effective for improving hardenability without adversely affecting graphitization and which do not cause any substantial degree of solid-solution hardening. In order to improve hardenability, it is desirable to add Cu in an amount of 0.05% or more. On the other hand, the addition of an excess amount of Cu causes precipitation of epsilon-Cu during cooling after box annealing, resulting in an increase in strength as well as an degradation in formability. Thus, the upper limit of the Cu content, when added, is restricted to 1.00%.

Ni (Nickel)

Nickel is an element, like Si, which increases graphitization. However, nickel does not cause solid-solution hardenability so much as does Si, and the addition of Ni is effective for achieving mildness of steel. For these purposes Ni in an amount of 0.05% or more is added. However, an excess amount of Ni causes solid-solution hardening of a ferritic phase and also an increase in manufacturing costs. Thus, the upper limit of Ni is defined as 2.00%.

P (Phosphorus)

P is said to be segregated along interfaces between cementite and ferrite and is one of the impurities of steel which suppresses movement of carbon to prevent precipitation of graphite. In contrast, it is important to the present invention to promote diffusion of carbon in order to shorten the time required to carry out box annealing for graphitization. It is especially important when the carbon content is relatively small compared with that for steels suitable for quench hardening like a steel employed in the present invention. According to the present invention, therefore, the upper limit of the P content is restricted to 0.020% in order to shorten the time required to carry out box annealing for graphitization (maximum heating hours up to 36 hours). Although there is no lower limit on P, it is preferable from a practical viewpoint to allow the presence of P in an amount of 0.005% or more.

S (Sulfur)

Sulfur is an impurity of steel which, like P, suppresses graphitization. As the content of sulfur increases, the length of time of box annealing required for achieving graphitization also increases. In addition, dissolved sulfur in steel impairs toughness of steel after strengthening by heat treatment, and it is necessary to reduce the presence of S to as a lower level as possible. For this purpose, the amount of S is restricted to 0.010% or less. Although there is no lower limit on S, it is preferable from a practical viewpoint of reducing manufacturing costs during steel making steps to allow the presence of S in an amount of 0.003% or more.

II. Graphitization

In order to ensure a certain level of quench hardening after high frequency induction heating it is necessary to incorporate a certain amount of carbon. However, when the lower limit of the carbon content is 0.20% as in the present invention, cementite is dispersed in steel causing an increase in strength. If the cementite is changed to graphite, this results in a decrease in strength and an improvement in formability. According to the present invention, 50% or more of the total amount of cementite is converted to graphite so as to effectively carry out the swaging and die-forming.

III. Conditions for forming and working

The method of forming and working of a toothed wheel of the present invention will be described with reference to FIGS. 1 through 7, in which a toothed wheel which is used as a drive plate is manufactured in accordance with the present invention. The following method of forming and working a toothed wheel is most suitable for the steel composition and structure described above.

As shown in FIG. 1, a disk blank 1 is punched out from a plate having a thickness of 2-3 mm, for example, and a central area of the disk blank 1 around a centering pin 4 is put between a fixing base 2 and pressing plate 3 with an outer peripheral edge portion 1a, i.e., swaging portion 1a being kept ready for swaging. The centering pin 4 extends from the fixing base 2 and is inserted into a center hole of the disk blank 1.

Figure 2:
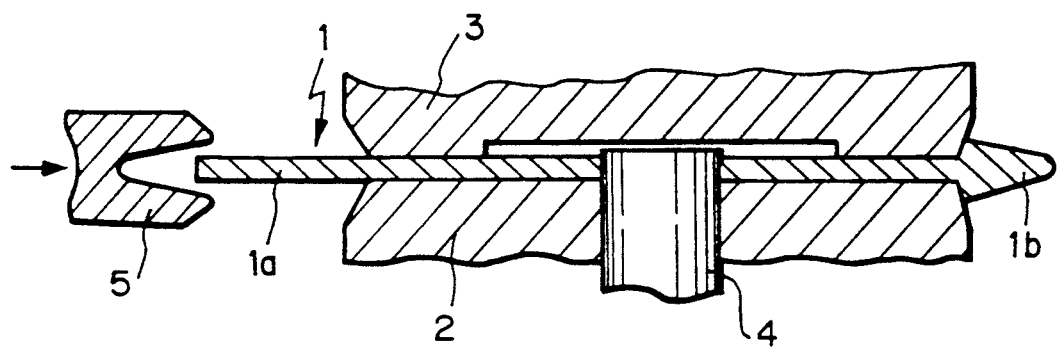
FIG. 2 is a cross-sectional view of a first swaging step.

FIG. 2 shows a first swaging carried out on the outer peripheral edge portion 1a of the blank 1 in the radial direction with a first swaging die 5 to form a first swaged portion 1b. A sectional view of the swaged portion 1b is shown on the right hand side of FIG. 2. The swaged portion 1b is tapered outwardly.

Figure 3:
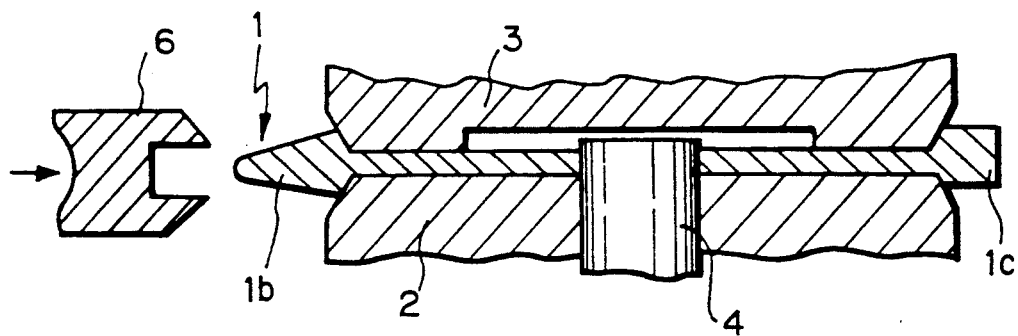
FIG. 3 is a cross-sectional view of a second swaging step.

As shown in FIG. 3, a second swaged portion 1c (see the right hand side of FIG. 3) is formed from the first swaged portion 1b with a second swaging die 6 having a rectangular section. The reason why swaging is carried out in two stages is to avoid buckling, and so that the second swaged portion 1c will be well formed to ensure a sufficient level of thickness on the inner side of the second swaged portion 1c. If the swaging is not carried out carefully, i.e., if the second waged portion 1c is not well defined, it is rather difficult to shape fine gear teeth by cold forging.

The next stage is to press the thin-wall portion of the blank to form a flat-bottomed dish-shaped wheel.

Figure 4:
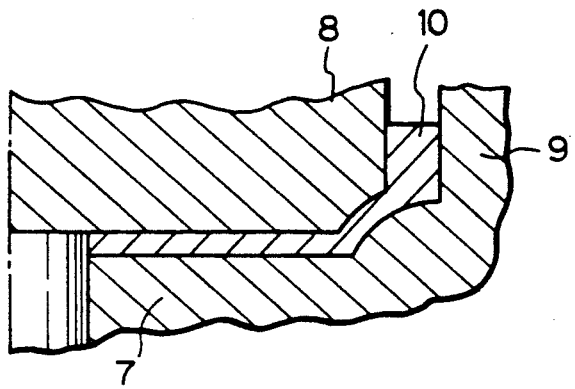
FIG. 4 is a cross-sectional view of the blank forming position.

FIG. 4 shows the gear blank 10 which has been formed with the second swaged portion 1c being press formed with a die 7 and a male die 8. A thin, flat, disk shaped portion surrounded by the swaged portion 1c is formed into a shallow dish. A peripheral edge of the swaged portion is defined by an outer die 9 to form the gear blank 10.

The next stage is a gear-forming stage in which cold forging is applied to form a gear in the peripheral outer or inner surface of the blank 10.

Figure 5:
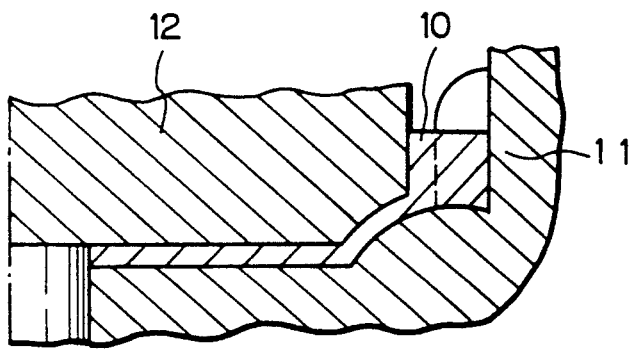
FIG. 5 is a cross-sectional view of the gear tooth forming position.

FIG. 5 shows an example in which gear teeth are formed in the outer peripheral surface of the blank 10. The blank 10 is placed coaxially with an outer die 11 in an arrangement such that the outer peripheral surface of the blank 10 opposes the inner side of the outer die 11 having teeth on the inner side. Into an area surrounded by the inner peripheral surface, a supporting die 12 is forced in the axial direction to form gear teeth in the outer peripheral surface of the blank 10. Since the outer diameter of the supporting die 12 is larger than the inner diameter of the blank 10, the second swaged portion 1c of the blank 10 is expanded outwardly by inserting the supporting die 12 into the blank 10. Thus, outer gear teeth corresponding to the teeth provided on the inner side of the outer die 11 are formed in the outer peripheral surface of the blank 10.

Figure 6:
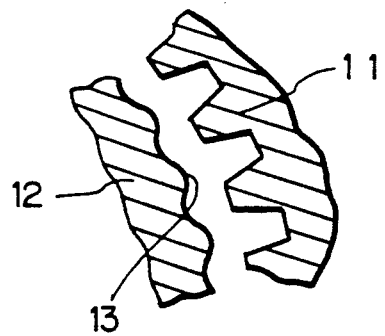
FIG. 6 is a plan view of outer peripheral and inner peripheral tooth-forming dies.

In a preferred embodiment, as shown in FIG. 6, undulations 13 having the same pitch as the gear teeth of the outer die 11 may be provided on the outer surface of the supporting die 12. When the undulations 13 are provided, it is easy to form the outer gear teeth in the outer peripheral surface of the blank 10. Thus, it is possible to carry out mass production of large diameter gears having a diameter of 200 mm or more. It is to be noted that in the prior art it has been thought that such large diameter gears cannot be formed by mass production.

In the above-described example, as shown in FIGS. 5 and 6, gear teeth are formed in the outer peripheral surface of the blank 10. It may also be possible to form inner gear teeth in the inner surface of the blank 10. In this case, the blank 10 is placed coaxially with an inner die having gear teeth in the outer peripheral surface of the die and a supporting die in contact with the outer peripheral surface of the blank. Alternatively, gear teeth may be provided on both the inner and outer surfaces of the blank.

In the above-described example, gear teeth are formed by forging with a gear die and supporting die. In still another embodiment, gear teeth may be formed with a roll forming apparatus 14 shown in FIG. 7. The roll forming apparatus 14 may be conventional, and a blank 10 is placed between a press supporting base 16 and a table 15 movable n the vertical direction. Against the outer peripheral surface of the blank 10, roll-forming dies 18, 18 are forced so as to form gear teeth. The roll-forming dies 18, 18 are supported by supporting bases 17, 17 which are adjustable in their positions backwardly and forwardly, as shown by arrows in the drawings.

According to the present invention, since there is no need to assemble a toothed wheel by means of forced-insertion or welding, dimensional distortion does not occur. Furthermore, since machining can be limited only to an upper edge portion of gear teeth, it is possible to reduce the number of steps of machining and to increase the yield of the product.

It is also possible to shape gear teeth in the peripheral outer and/or inner surfaces of the blank, which have been prepared by the method shown in FIGS. 1 through 5, by machining with a hobbing machine and the like. It may also be possible to shape the gear teeth by rolling with a rotating tool placed at a given position.

IV. Martensite Structure and Hardening

According to the present invention, at least the surface area of gear teeth is changed into a martensite structure. This is because such a hardened surface is necessary to avoid or suppress abrasive wear caused by occlusion of opposing gear teeth. For this purpose, it is desirable that the depth to which the surface is quench-hardened be at least 20 micrometers, and preferably 100 micrometers or deeper. In order to achieve the highest hardness, it is advisable to change all the structure of gear teeth into a martensite structure. However, it is also necessary to ensure a sufficient level of resistance to shock and fatigue, so it is desirable to limit the depth of quench-hardening to about 100 micrometers.

Figure 8:
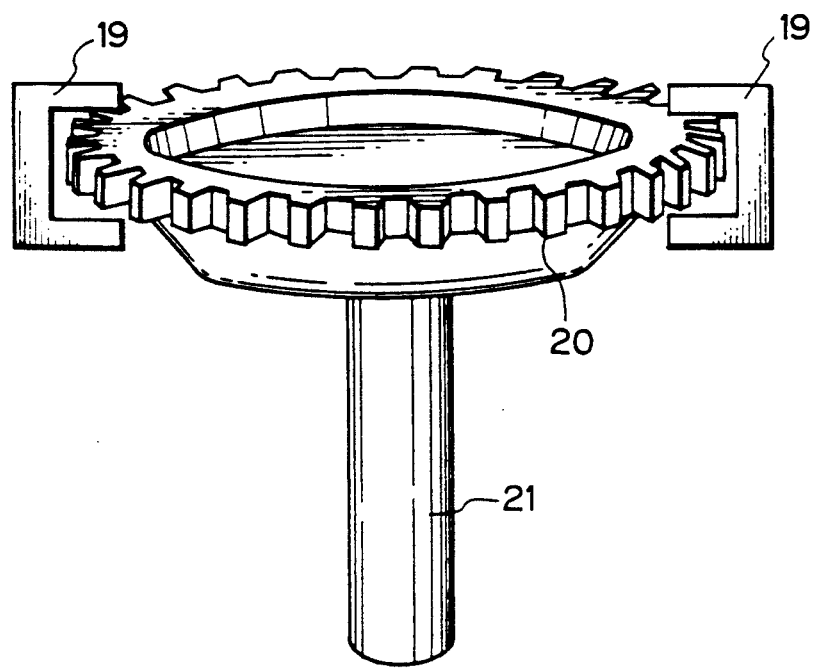
FIG. 8 is a schematic perspective view of induction hardening of gear tooth of a drive plate.

FIG. 8 schematically shows a method of hardening gear teeth with a high frequency induction heating coil, in which a gear 20 for a drive plate, after having been formed as previously described, is fixed to a rotary shaft 21, and the gear 20 is heated to a predetermined temperature with the high frequency induction heating coil 20 while the gear is rotated around the shaft 21. After heating to the predetermined temperature, the heating coil 19 is removed and water or oil is sprayed on the peripheral outer surface with an conventional water- or oil-spraying apparatus so as to quench the gear teeth portion of the gear 20.

Conventionally, it has been thought that it is necessary to heat at 800° C. or higher for 3 minutes or longer in order to carry out diffusion of carbon from graphite to a matrix phase. However, according to the present invention, since graphite is flattened in a deformation direction by plastic deformation and the contact area of graphite with a matrix is increased, a desirable martensite structure can be obtained by quenching after heating for only 10–30 seconds when the heating temperature is 800° C. or higher. This is because a higher level of plastic deformation has been applied to the toothed wheel of the present invention. Thus, a suitable heating means is high frequency induction heating. When such induction heating is employed, it is possible to markedly shorten the heating time.

When it is necessary to heat gear teeth provided in the inner surface of the blank, it is easy to do so with the induction heating coil 19 which will be able to reach and heat the gear teeth on the inner side.

As mentioned before, the area and the depth to be hardened are determined depending on the use of the gear. Areas other than the toothed area are usually kept free of hardening, but it may be advisable to apply quench hardening to an area which contacts a rotary member, e.g., a center bore of the toothed wheel.

The present invention will be further described in conjunction with some working examples, which are presented merely for illustrative purposes, and are not restrictive of the present invention at all.

EXAMPLES

Example 1

Steel plates 3 mm thick and having the steel compositions shown in Table 1 were manufactured. The graphitization ratio was varied as indicated in Table 2 by varying the heating temperature and time. From these steel plates, JIS No. 5 test pieces were cut and were subjected to tensile tests. A series of disk blanks having the same series of steel compositions shown in Table 1 were prepared to manufacture toothed wheels for a drive plate. Since cracking occurs sometimes during swaging or gear-forming, it was determined by inspection whether cracking occurred for each of the blanks during swaging and gear-forming. Results of the inspections are shown in Table 2.

From the results shown in Table 2, it is noted that mechanical properties greatly depend on the graphitization ratio and the content of Si, Ni and Cu, which are elements having a great influence on solid-solution hardening of steel. As the graphitization ratio decreases, the strength increases. As the content of these elements increases, the strength increases and elongation decreases.

Occurrence of cracking was rare when steel plates having steel compositions within the present invention were used compared with when steel plates outside the present invention was used. Regarding working methods, it is noted that cracking occurred very rarely during swaging when the steel plates of the present invention were used. Furthermore, when steel plates outside the range of the present invention were used, cracking increasingly occurred during the following gear-forming step, but there was no such a tendency when the steel plates of the present invention were used.

In Run No. 1, there was no cracking because the carbon content was below the range of the present invention.

TABLE 1

| Run No. | Chemical Composition (wt %, bal:Fe, Incidental Impurities) | | | | | | | | | | | Remarks |
|---|---|---|---|---|---|---|---|---|---|---|---|---|
| | C | Si | Mn | P | S | Ni | Cu | sol.Al | N | Ca | B | |
| 1 | 0.15 | 0.22 | 0.17 | 0.011 | 0.006 | Tr | Tr | 0.062 | 0.0074 | Tr | 0.0014 | x |
| 2 | 0.23 | 0.18 | 0.19 | 0.013 | 0.008 | Tr | Tr | 0.052 | 0.0067 | Tr | 0.0009 | o |
| 3 | 0.58 | 0.23 | 0.17 | 0.010 | 0.005 | Tr | Tr | 0.064 | 0.0076 | Tr | 0.0015 | o |
| 4 | 0.78 | 0.25 | 0.16 | 0.009 | 0.004 | Tr | Tr | 0.069 | 0.0080 | Tr | 0.0018 | x |
| 5 | 0.34 | 0.08 | 0.16 | 0.010 | 0.005 | Tr | Tr | 0.067 | 0.0078 | Tr | 0.0016 | o |
| 6 | 0.31 | 0.24 | 0.17 | 0.011 | 0.006 | Tr | Tr | 0.060 | 0.0072 | Tr | 0.0013 | o |
| 7 | 0.36 | 0.86 | 0.15 | 0.009 | 0.004 | Tr | Tr | 0.071 | 0.0082 | Tr | 0.0019 | o |
| 8 | 0.30 | 1.24 | 0.18 | 0.012 | 0.007 | Tr | Tr | 0.057 | 0.0071 | Tr | 0.0011 | x |
| 9 | 0.32 | 0.22 | 0.10 | 0.011 | 0.006 | Tr | Tr | 0.062 | 0.0074 | 0.0045 | 0.0014 | o |
| 10 | 0.35 | 0.25 | 0.56 | 0.009 | 0.004 | Tr | Tr | 0.069 | 0.0080 | Tr | 0.0018 | x |
| 11 | 0.28 | 0.18 | 0.19 | 0.028 | 0.019 | Tr | Tr | 0.052 | 0.0067 | Tr | 0.0009 | x |
| 12 | 0.29 | 0.19 | 0.18 | 0.012 | 0.007 | 1.26 | 0.30 | 0.055 | 0.0069 | 0.0047 | 0.0010 | o |
| 13 | 0.33 | 0.23 | 0.17 | 0.010 | 0.005 | 2.34 | 0.27 | 0.064 | 0.0076 | 0.0041 | 0.0015 | x |
| 14 | 0.31 | 0.21 | 0.17 | 0.011 | 0.006 | 0.20 | 1.31 | 0.060 | 0.0072 | 0.0044 | 0.0013 | x |
| 15 | 0.35 | 0.25 | 0.16 | 0.009 | 0.004 | 0.25 | Tr | 0.035 | 0.0080 | 0.0039 | 0.0018 | o |
| 16 | 0.32 | 0.22 | 0.17 | 0.011 | 0.006 | 0.21 | 0.28 | 0.320 | 0.0074 | 0.0043 | 0.0014 | o |
| 17 | 0.36 | 0.26 | 0.15 | 0.009 | 0.004 | 0.26 | 0.24 | 1.250 | 0.0082 | 0.0037 | 0.0019 | x |
| 18 | 0.31 | 0.21 | 0.17 | 0.011 | 0.006 | 0.20 | 0.28 | 0.060 | 0.0018 | 0.0044 | 0.0013 | x |
| 19 | 0.28 | 0.18 | 0.19 | 0.013 | 0.008 | 0.16 | 0.31 | 0.052 | 0.0085 | 0.0049 | 0.0009 | o |
| 20 | 0.34 | 0.24 | 0.16 | 0.010 | 0.005 | 0.24 | 0.26 | 0.067 | 0.0124 | 0.0040 | 0.0016 | x |
| 21 | 0.31 | 0.21 | 0.17 | 0.011 | 0.006 | 0.20 | 0.28 | 0.060 | 0.0072 | 0.0012 | 0.0013 | o |
| 22 | 0.30 | 0.20 | 0.18 | 0.012 | 0.007 | 0.19 | 0.29 | 0.057 | 0.0071 | 0.0066 | Tr | x |
| 23 | 0.36 | 0.26 | 0.15 | 0.009 | 0.004 | 0.26 | 0.24 | 0.071 | 0.0082 | 0.0057 | 0.0056 | x | o: Present Invention, x: Outside the range of the Present Invention.

TABLE 2

| Run No. | Graphi- tization (%) | YP (kgf/mm²) | TS (kgf/mm²) | EL (%) | Cracking during Swaging | Cracking during Die-Forming | Remarks |
| --- | --- | --- | --- | --- | --- | --- | --- |
| 1 | 55 | 20.0 | 33.3 | 44.4 | 0 | 0 | x |
| 2 | 65 | 19.1 | 34.1 | 44.5 | 0 | 0 | o |
| 3 | 100 | 19.7 | 32.3 | 45.5 | 0 | 5 | o |
| 4 | 100 | 20.9 | 33.1 | 43.8 | 60 | 95 | x |
| 5 | 85 | 20.7 | 33.4 | 43.7 | 0 | 0 | o |
| 6 | 90 | 19.2 | 32.5 | 45.9 | 0 | 0 | o |
| 7 | 100 | 20.1 | 31.5 | 45.8 | 0 | 0 | o |
| 8 | 100 | 22.6 | 38.9 | 38.6 | 40 | 60 | x |
| 9 | 85 | 19.9 | 33.2 | 44.5 | 0 | 0 | o |
| 10 | 40 | 26.0 | 41.2 | 35.2 | 100 | Discontinued | x |
| 11 | 30 | 21.8 | 39.0 | 39.0 | 70 | 95 | x |
| 12 | 100 | 17.8 | 31.2 | 48.5 | 0 | 10 | o |
| 13 | 100 | 23.3 | 38.2 | 38.5 | 20 | 80 | x |
| 14 | 75 | 21.5 | 36.4 | 40.9 | 30 | 60 | x |
| 15 | 75 | 20.2 | 37.2 | 44.3 | 0 | 0 | o |
| 16 | 95 | 18.9 | 31.4 | 47.1 | 0 | 0 | o |
| 17 | 100 | 21.9 | 34.5 | 41.8 | 30 | 50 | x |
| 18 | 65 | 20.2 | 34.9 | 42.3 | 20 | 40 | x |
| 19 | 85 | 28.4 | 32.8 | 46.3 | 0 | 0 | o |
| 20 | 85 | 21.9 | 35.3 | 41.4 | 0 | 20 | x |
| 21 | 90 | 19.2 | 32.5 | 45.9 | 0 | 0 | o |
| 22 | 45 | 21.9 | 37.8 | 39.6 | 30 | 60 | x |
| 23 | 45 | 25.3 | 39.5 | 36.5 | 50 | 80 | x | o: Present Invention, x: Outside the range of the Present Invention

Example 2

The toothed wheels for use in drive plates which had been successfully manufactured in Example 1 in accordance with the forming process shown in FIGS. 1 through 6 were then subjected to high frequency induction hardening, which was carried out using a high frequency induction heating apparatus shown in FIG. 8. Namely, the gear teeth were heated at 950° C. for 10 seconds at a frequency of 150 KHz at 50 kw (8 kv×6.25 A) and were cooled by spraying. The hardness of the surface of the gear teeth in the outer peripheral surface was expressed as the Hv hardness.

The results are shown in Table 3.

As is apparent from the data shown in Table 3, it was only when the chemical composition of the steel plate and its metallurgical structure were within the range of the present invention that cracking did not occur during forming and the Hv hardness after quenching was 300 or higher.

TABLE 3

| Run No. | Surface Hardness After High Frequency Hardening (Hv) | Remarks |
| --- | --- | --- |
| 1 | 165 | x |
| 2 | 445 | o |
| 3 | 578 | o |
| 4* | 629 | x |
| 5 | 476 | o |
| 6 | 489 | o |
| 7 | 524 | o |
| 8* | 486 | x |
| 9 | 456 | o |
| 10 | — | x |
| 11* | 432 | x |
| 12 | 428 | o |
| 13* | 463 | x |
| 14* | 489 | x |
| 15 | 438 | o |
| 16 | 486 | o |
| 17* | 495 | x |
| 18* | 467 | x |
| 19 | 458 | o |
| 20* | 469 | x |
| 21 | 426 | o |
| 22* | 284 | x |
| 23* | 274 | x | o: Present Invention.
x: Outside the range of the Present Invention.
*: Cracking occurred as indicated in Table 2.

Example 3

Figure 7:
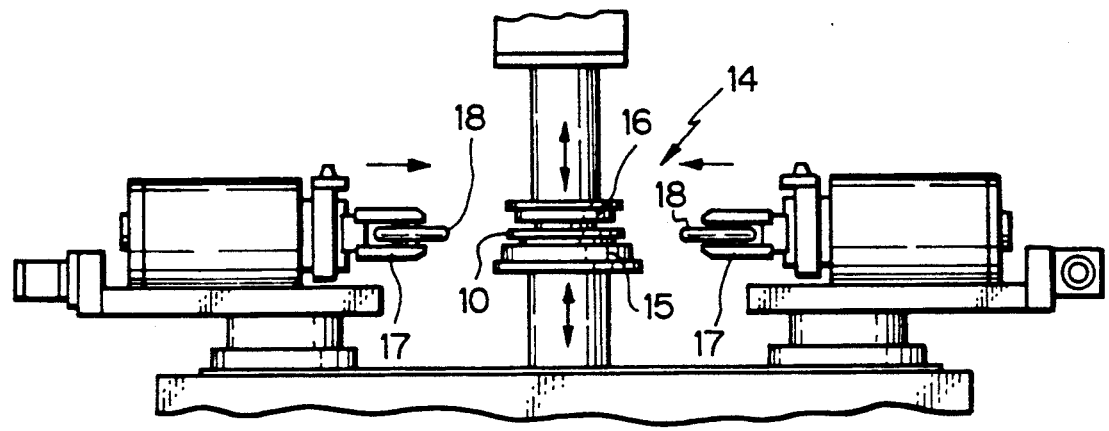
FIG. 7 is an elevation of a roller forming apparatus for forming gear teeth.

Example 1 was repeated for Run Nos. 6, 15 and 21 until gear-forming. In this example, gear-forming in the outer peripheral surface of the blank was carried out by roll forging as shown in FIG. 7. After formation of gear teeth, high frequency hardening was carried out under the same conditions as in Example 2.

There was no cracking during forming in every case. The surface hardnesses on the Hv scale were 475, 412, and 408, respectively, which are satisfactory.

Thus, according to the present invention, it is possible to provide a one-piece toothed wheel which is free from cracking during forming including swaging and die-forming or roll forming. The toothed wheel of the present invention can be subjected to high frequency hardening to achieve a surface hardness of 300 (Hv) or higher, resulting in a marked improvement int he resistance to wear and fatigue at lower costs.

Furthermore, according to the present invention there is no need to carry out finishing after die-forming or roll forming and surface hardening can be carried out by high frequency hardening more easily at lower costs compared with surface hardening treatments, such as soft nitriding.

What is claimed is:

1. A toothed wheel for use in automobiles and in a form of a dish-shaped disk having a thickened peripheral edge portion in an outer and/or inner side of which gear teeth are present, at least the surface area of the gear teeth being of a martensitic structure, the disk being made of a steel comprising a ferrite-cementite-graphite structure in which 50% or more of cementite originally present in a starting material for said steel has been changed to graphite, the steel composition of the disk consisting essentially of, by weight %:

C: 0.20–0.70%, Si: 0.05–1.00%, Mn: 0.05–0.50%, sol.Al: 0.01–1.00%, N: 0.002–0.010%, B: 0.0003–0.0050%, Ca: 0–0.01%, Cu: 0–1.00%, Ni: 0–2.00%, and a balance of Fe and incidental impurities in which the content of P is restricted to not larger than 0.020% and the content of S is restricted to not larger than 0.010%.

2. A toothed wheel as defined in claim 1 wherein at least one of 0.001–0.01% of Ca, 0.05–1.00% of Cu, and 0.05–2.00% of Ni is contained in the steel.

* * * * *